(12) United States Patent
Grembler et al.

(10) Patent No.: US 9,467,691 B2
(45) Date of Patent: Oct. 11, 2016

(54) VIDEO SYSTEM FOR DISPLAYING IMAGE DATA, METHOD AND COMPUTER PROGRAM

(71) Applicant: Robert Bosch GmbH, Stuttgart (DE)

(72) Inventors: Jan Grembler, Graefenberg (DE); Thomas Huber, Erlangen (DE)

(73) Assignee: Robert Bosch GmbH, Stuttgart (DE)

( * ) Notice: Subject to any disclaimer, the term of this patent is extended or adjusted under 35 U.S.C. 154(b) by 383 days.

(21) Appl. No.: 13/759,163

(22) Filed: Feb. 5, 2013

(65) Prior Publication Data

US 2013/0215956 A1    Aug. 22, 2013

(30) Foreign Application Priority Data

Feb. 16, 2012  (DE) ........................ 10 2012 202 315

(51) Int. Cl.
| | |
|---|---|
| H04N 7/12 | (2006.01) |
| H04N 19/103 | (2014.01) |
| H04N 21/2343 | (2011.01) |
| H04N 21/2662 | (2011.01) |
| H04N 21/6587 | (2011.01) |
| H04N 21/845 | (2011.01) |
| H04N 19/12 | (2014.01) |
| H04N 19/162 | (2014.01) |
| H04N 19/127 | (2014.01) |
| H04N 19/164 | (2014.01) |

(52) U.S. Cl.
CPC ........ *H04N 19/00018* (2013.01); *H04N 19/12* (2014.11); *H04N 19/162* (2014.11); *H04N 21/23439* (2013.01); *H04N 21/2662* (2013.01); *H04N 21/6587* (2013.01); *H04N 21/8455* (2013.01); *H04N 19/127* (2014.11); *H04N 19/164* (2014.11)

(58) Field of Classification Search
USPC ...................................................... 375/240.02
See application file for complete search history.

(56) References Cited

U.S. PATENT DOCUMENTS

| | | |
|---|---|---|
| 8,265,168 B1 | 9/2012 | Masterson et al. |
| 2002/0065969 A1* | 5/2002 | Schultz .......................... 710/260 |
| 2002/0112244 A1* | 8/2002 | Liou et al. ....................... 725/93 |
| 2005/0018911 A1 | 1/2005 | Deever |
| 2007/0025688 A1 | 2/2007 | Pejhan |
| 2008/0104644 A1* | 5/2008 | Sato et al. ....................... 725/90 |
| 2009/0161755 A1* | 6/2009 | Gordon et al. ........... 375/240.02 |
| 2011/0225315 A1 | 9/2011 | Wexler et al. |
| 2012/0004042 A1* | 1/2012 | Perry et al. ..................... 463/42 |
| 2012/0004545 A1* | 1/2012 | Ziv-Ari et al. ............... 600/437 |

FOREIGN PATENT DOCUMENTS

WO    2009122925    10/2009

* cited by examiner

*Primary Examiner* — Tracy Y Li
(74) *Attorney, Agent, or Firm* — Michael Best & Friedrich LLP

(57) ABSTRACT

A video system 1 for displaying image data. The system includes a server (2) having a coder device (5) which can be operated in a number of operating modes, and a client (3) connected to the server (2) via a network (4). The coder device (5) is configured to code video data (V) in accordance with an active operating mode and to output coded transmission data (U). The client (3) is connected to the server (2) via a network (4), and configured to request, to further process, and to display the coded transmission data (U) from the coder device (5). The coder device (5) operates in the active operating mode as determined by the client (3).

17 Claims, 5 Drawing Sheets

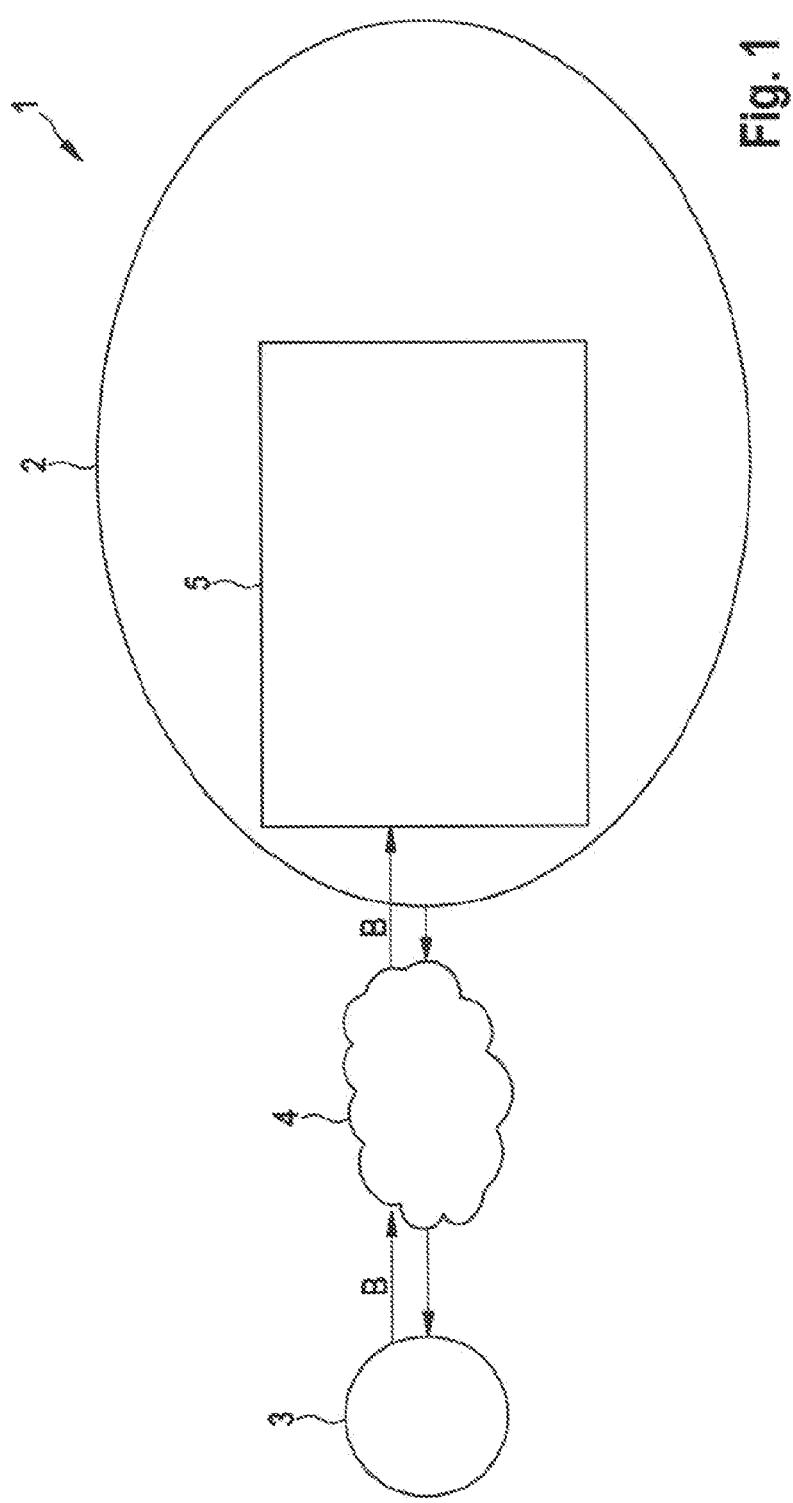

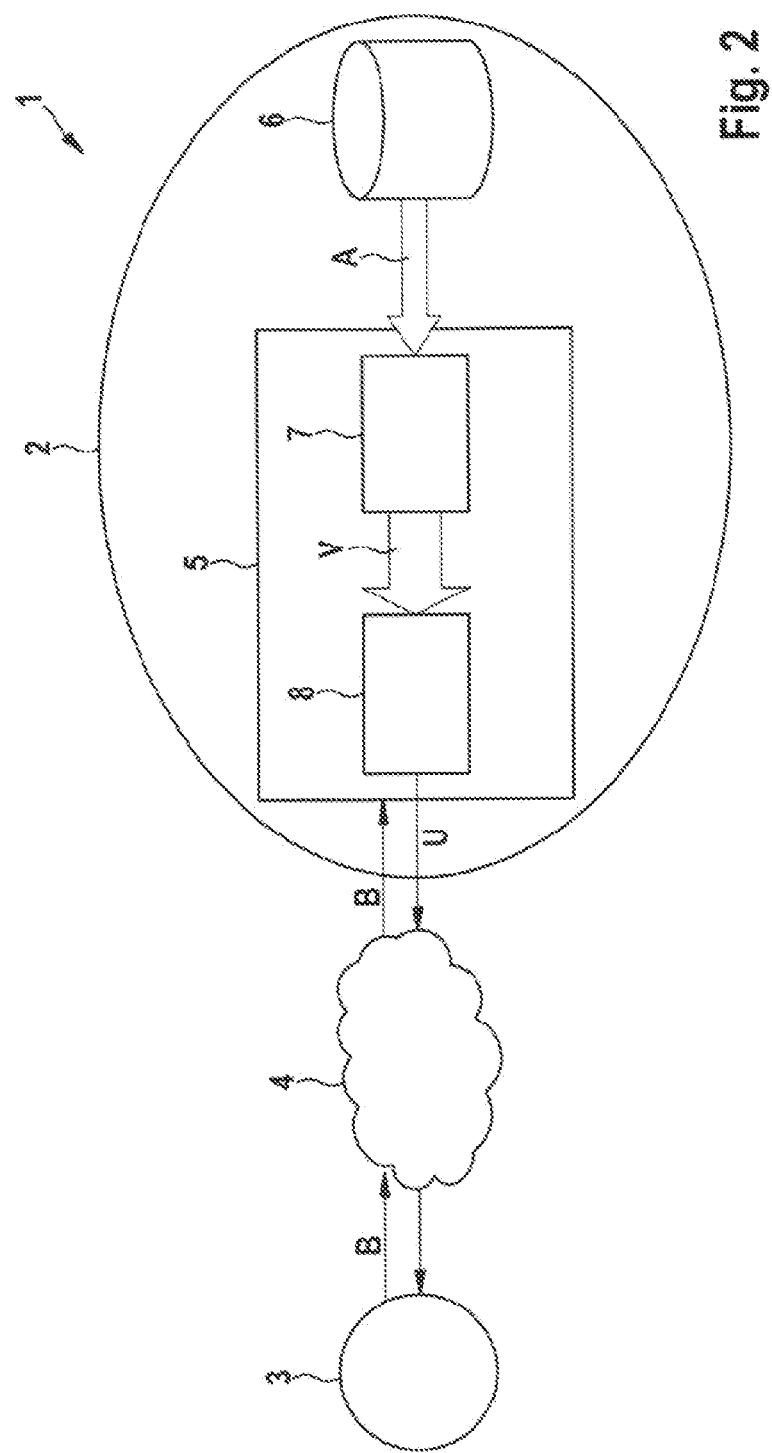

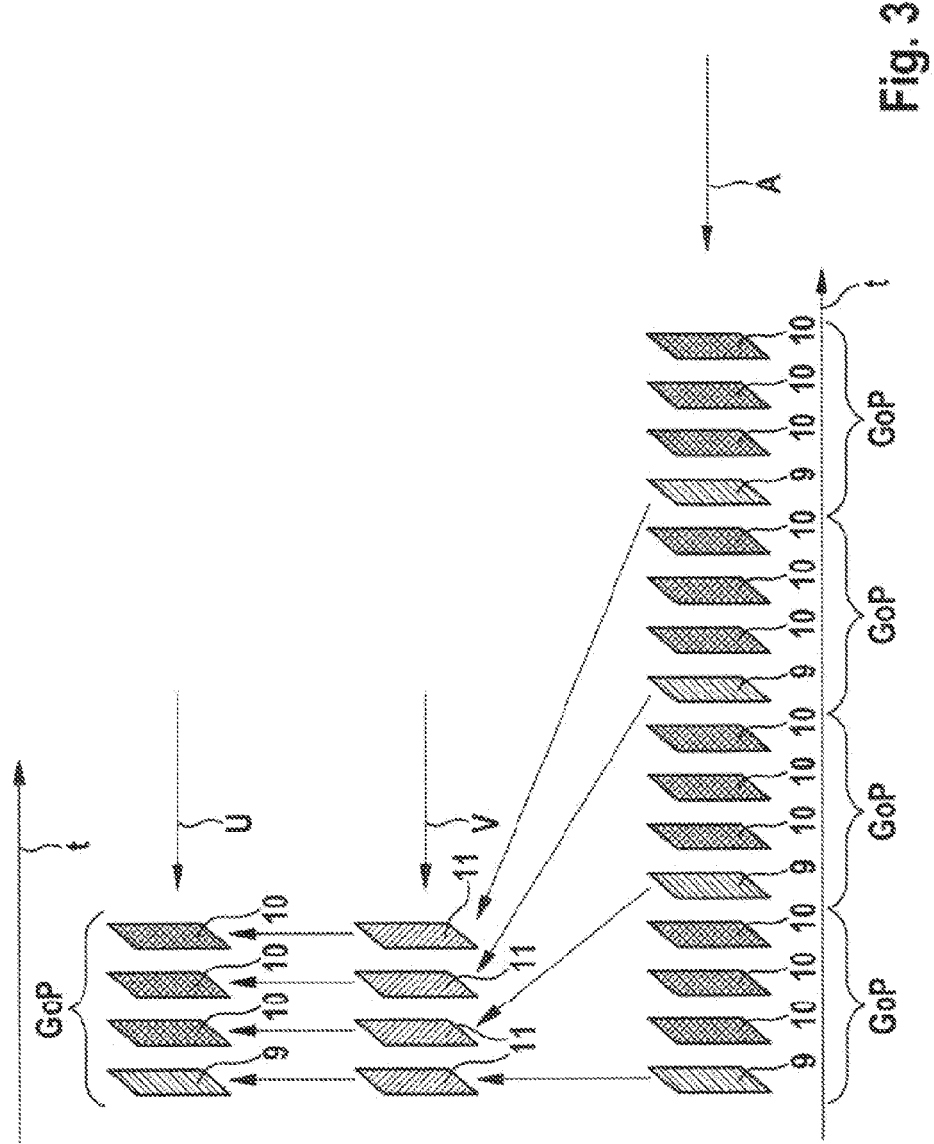

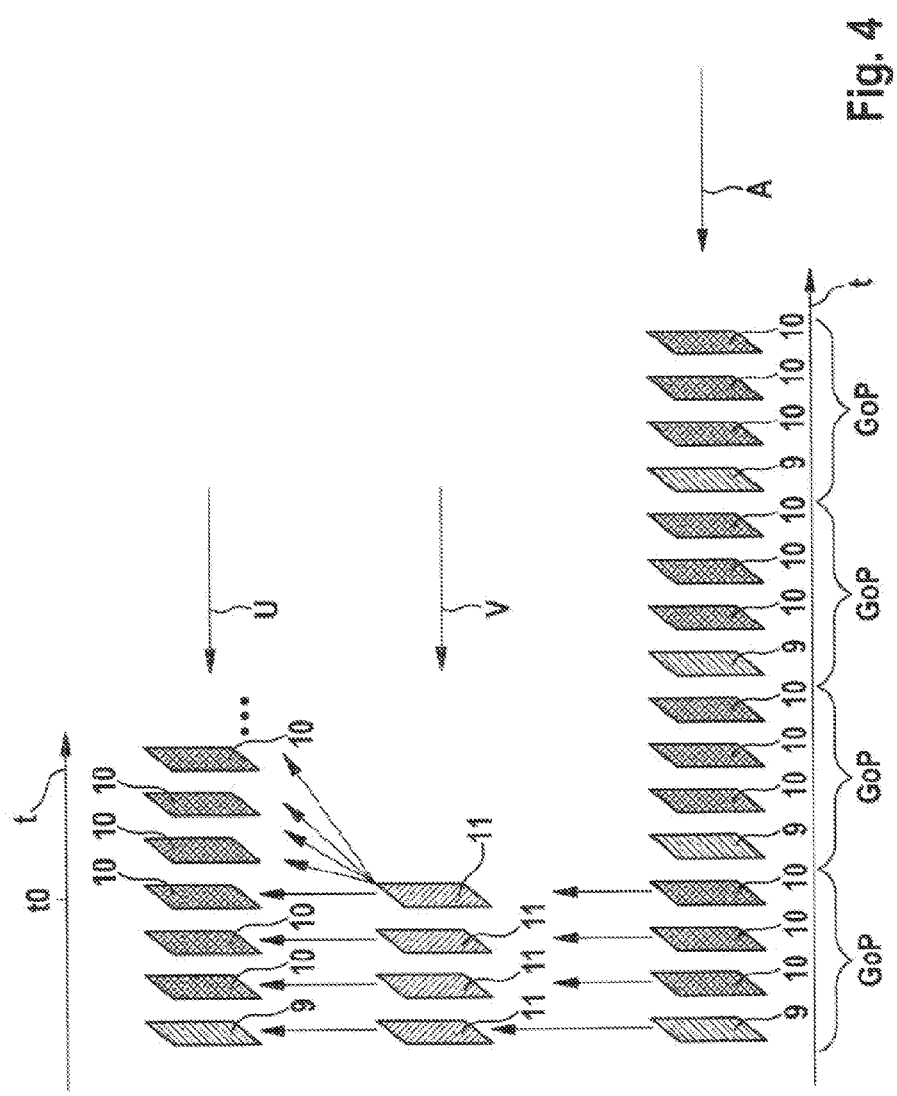

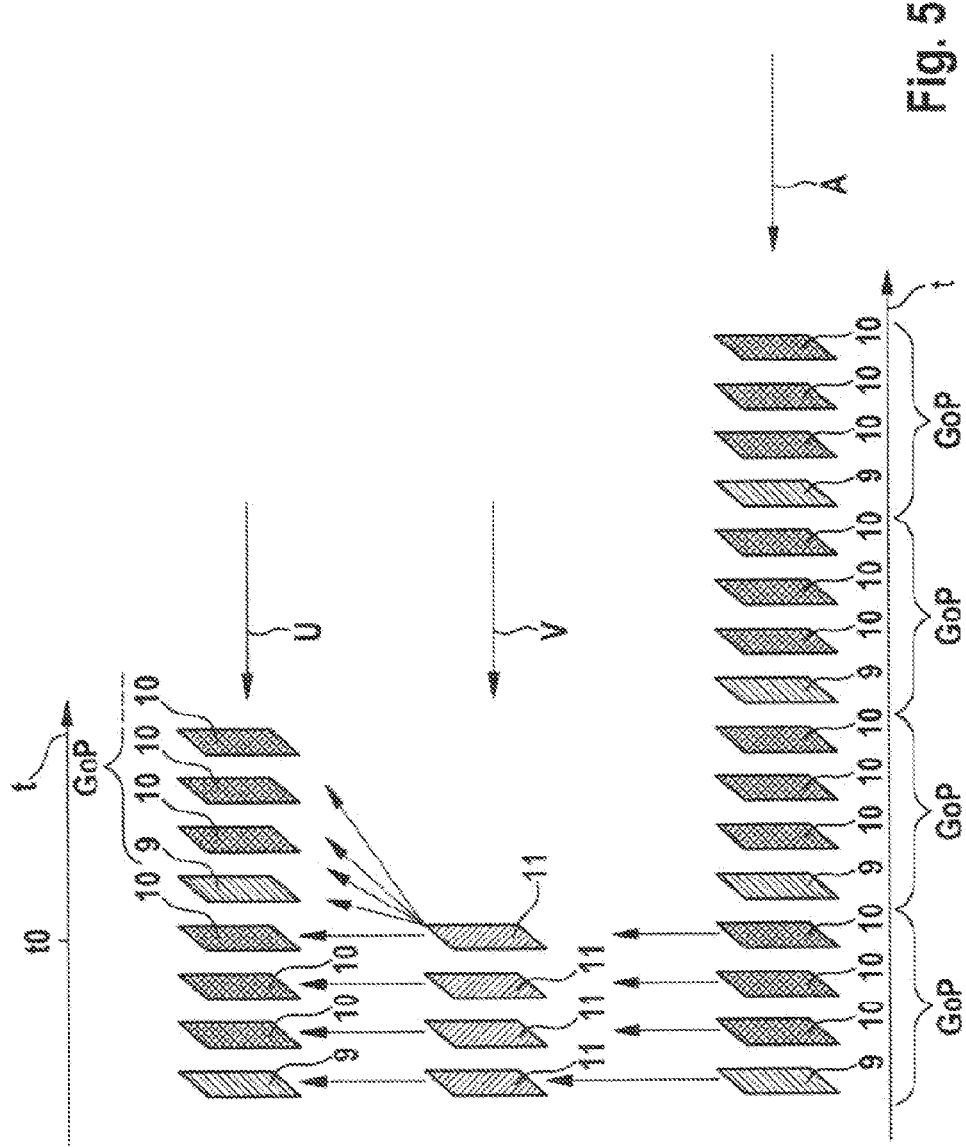

VIDEO SYSTEM FOR DISPLAYING IMAGE DATA, METHOD AND COMPUTER PROGRAM

BACKGROUND OF THE INVENTION

The invention relates to a video system for displaying image data comprising a server, the server having a coder device which can be operated in a number of operating modes as the active operating mode, wherein the coder device is designed for coding video data in accordance with the active operating mode and for outputting coded transmission data, and comprising a client, wherein the client can be connected to the server via a network and wherein the client is designed for the requesting, the further processing and the displaying of the coded transmission data by the coder device in a session. The invention also relates to a method for displaying image data, to a computer program and to a coder device.

In the meantime, it is customary to store image data such as, for example, video sequences on servers and to load these as required by means of a client, which is connected to the server, via a network and display them on the client.

Since the image data are to be retrieved flexibly, it must be ensured that a retrieval of the image data can always take place with a good quality corresponding to the data transmission rate even in the case of network connections with different data transmission rates. The data transmission rates extend, e.g., from 144 kbit/s in the case of an ISDN link up to 1000 Mbit/s in the case of a 1000-Mbit Ethernet network. To transmit the image data without latency and judder especially in the case of bandwidth-limited network connections, it is customary to compress the image data in different ways, the different ways of compression differing by the bit rate needed for the transmission of the compressed image data. If then a client is connected to the server via a network connection with a low data transmission rate, it is provided with the compressed image data at a low bit rate. If, in contrast, the data transmission rate of the network connection is high, the client receives the compressed image data at a correspondingly higher bit rate and thus in a higher image quality.

Such a method for transmitting image data is represented, for example, in printed document US2011/0225315A1 which may form the nearest prior art. In this document, a server-client system is described, the server supplying the client with a stream of image data. The image data are stored in the server in various versions, the versions differing in their bit rate and thus in their quality. During the transmission of the image data, a transmission buffer in the server is observed, the current version of the image data being retained or a version of the image data having a higher or lower bit rate being selected in dependence on the filling level of the transmission buffer.

SUMMARY OF THE INVENTION

The video system according to the invention is suitable and/or designed for displaying image data. The image data are designed especially as a stream of image data, especially as a video sequence. A video sequence is understood to be especially a sequencing of frames which are arranged to be equidistant in time and/or show a variation in time of an image scene.

The video system comprises a server, the server having a coder device which can be operated in a number of operating modes as the active operating mode. The server can be, e.g., a single computer, a virtual server or a logical unit as server.

The coder device is designed for coding video data in dependence on the active operating mode and for outputting coded transmission data. Before the coding, the video data are particularly preferably available as raw data, that is to say as frames which are arranged behind one another in time in such a manner that they produce the image data stream. The coded transmission data are the compressed video data. Examples for the compression of video data are given by the MPEG-2, MPEG-4 standard. In particular, the coding is effected in accordance with the H.264 standard.

The video system comprises a client, wherein the client can be designed, for example, as another computer, alternatively or additionally also as a mobile phone, smartphone, PDA etc. The client is connectable, especially connected to the server via a network, for example an Ethernet network or the Internet, cablelessly or cable-connected. Client and server can bidirectionally exchange data via the network. The client is designed to request, process further and subsequently display, e.g. on a screen, coded transmission data from the coder device, especially during a session. The further processing relates especially to the conversion of the coded transmission data into image data which are displayable by means of the client. In particular, the session can be defined as the period of utilization of the server by the client.

In particular, the video system converts streaming, the image data being received by the client as coded transmission data and simultaneously reproduced. The transmitted image data are also called a live stream or a stream. The coded transmission data preferably correspond to the MPEG-4 AVC-BP standard, also called baseline profile.

Within the context of the invention it is proposed that the coder device can be operated, apart from the replay operating mode, also in the Stop, Freeze Frame, Fast Forward and/or Fast Rewind operating modes as the active operating mode, wherein the client determines the active operating mode of the coder device. The said operating modes are requested, as active operating mode, for example by a user of the client at the client. The client conveys the active operating mode to the coder device which changes its operating mode in accordance with the request and codes and outputs coded transmission data in accordance with the active operating mode. In particular, the video system is designed for the client to be able to adjust or select the active operating mode of the coder device. The client has for the further processing of the coded transmission data a decoder device which, in particular, operates preferably in accordance with the MPEG-4 AVC-BP standard, also called baseline profile. In particular, the coded transmission data can be treated by the client as a stream which is decodable as part of the baseline profile independently of the selected operating mode.

The advantage of the invention can be seen in the fact that the coder device only needs to code the video data and the network only needs to convey the coded transmission data which are currently requested by the user of the client. Thus, in the Stop operating mode as the active operating mode, the coding and the transmission of further image data can be stopped immediately and the server and the network thus be relieved. In the Fast Forward and Fast Rewind operating modes as active operating mode, a version of the image data tightened up in time can be coded by the coder device, wherein the version of the image data tightened up in time comprises fewer images than the version of the same image data not tightened up in time so that the server and the network are also relieved of load in these operating modes.

It is a further advantage of the invention that the requirements for the client are very low. Thus, the client is supplied with a stream independently of the selected operating mode and especially in the Freeze Frame, Fast Forward and/or Fast Rewind operating mode.

In a preferred embodiment of the invention, the coder device is exclusively allocated to the client during the session. Due to the exclusive allocation, a 1:1 connection is formed between client and coder device so that the coder device can exclusively respond to the requests of the client. The advantage of the embodiment can be seen especially in that by the exclusive allocation and the possibility of determining the operating mode of the coder device, the user of the client is offered maximum flexibility and interactivity for controlling the generation and the transmission of the coded transmission data. It is thus left to the user to intervene in the transmission of the coded transmission data at any time and place the coder device into another operating mode. In particular, the user, by inputting commands at the client, can jump at any time optionally to any positions in the image data and, starting from there, start any operating mode of the coder device.

The coder device can be a hardware component of the server, the coder device is preferably designed as a coder entity, that is to say as a software component. For example, in the case of a multiplicity of clients, a separate coder entity can be started on the server for every client. In particular, each of the coder entities is exclusively allocated to precisely one client.

In an advantageous embodiment of the invention, the coder device is designed for coding the video data in real time. In this context, the real time is defined by the requirements of the client so that in the Replay operating mode, video data are coded with a time offset of, for example, less than 2 seconds, especially less than 1 second. In the Fast Forward or Fast Rewind operating mode, the coded transmission data are coded with a delay of less than 2 seconds, especially of less than 1 second after the request by the client. The real-time processing is advantageous since in the case of a switch-over of the operating mode, the coder device can respond quickly to this and a user can control the playback of the image data without delay or with little delay. In particular, the coded transmission data are generated on-the-fly by the coder device and, in doing so, can be adapted to the current operating mode.

Particularly preferably, it is provided that the video system has a device for determining or estimating the available or usable data transmission rate of the network, especially of the network connection between server and client. For example, the device can estimate the available or usable data transmission rate by means of a filling level of an output buffer of the server to the network. The device can be designed, for example, like in US2011/0225315A1 cited initially. The video system and especially the server and especially the coded device is or are designed to select, in dependence on the available or usable data transmission rate of the network connection used, a compression for the video data which leads to coded transmission rates, the data transmission rate of which—also called bit rate—is smaller than the available data transmission rate of the network connection in order to provide for a representation of the image data on the client which is free of latency and judder. As an alternative, the client can determine the data transmission rate of the coded transmission data.

The automatic or manual flexible adaptation or change of the data transmission rate, respectively, of the coded transmission data described is provided for by the exclusive allocation of the coder device to the client in a particularly memory-saving manner since the coder device, in the case of a change of the desired data transmission rate of the coded transmission data, resets the coding. In particular, the resetting of the coding occurs immediately, without delay and/or in real time. Instead of this procedure, the image data will otherwise have to be compressed in several quality stages—as known from the prior art—in order to then select and to use as required the coded transmission data which have the desired data transmission rate. This known procedure would have the disadvantage that image data which may never be called up would have to be compressed in several copies as coded transmission data and stored in different quality levels to be held in reserve.

It is preferred that in the Fast Forward and/or Fast Rewind operating mode, only a selection of images of the image data, especially of the output data, are output as selected images by the coder device coded as coded transmission data. In particular, there are in the image data between the selected images intermediate frames which are not transmitted in this operating mode. If a video sequence has, for example, 50 images per second only every second, every third, every fourth etc. image of the image data is coded in the Fast Forward or Fast Rewind operating mode and transmitted as coded transmission data via the network to the client. This embodiment has the advantage that in the case of a Fast Forward or Fast Rewind, the image data are not completely transmitted and the client activates the Fast Forward or Fast Rewind on the basis of the complete image data on the client side but the said operating modes are already prepared by the coder device on the server side.

In a preferred development of the invention, the video system is designed in such a manner that in the Freeze Frame operating mode, a current image of the video data is coded in increased quality compared with the identical current image previously transmitted, and transmitted to the client. As soon as a user selects the Freeze Frame operating mode at the client, it is assumed that the user wishes to observe the current image in greater detail. In the Freeze Frame operating mode, the current image is recoded at the server and further transmission data relating to the current image are transmitted to the client so that the image quality of the current image at the client is improved. Optionally additionally, it can be provided that in the recoding, the resolution of the current image is changed and the current image is coded with a higher resolution and transmitted to the client. In the Freeze Frame operating mode, the available data transmission rate of the network connection is utilized for improving a current image in the display on the client.

In a possible concrete embodiment of the invention, the coder device is designed as a transcoder device, the server having a storage device, especially a database, in which coded output data are deposited. It is thus provided that the image data are initially coded as coded output data for storage in order to keep the memory requirement low in the storage device of the server. This first coding is carried out preferably with minimal or no loss of quality of the image data. In particular, the coding is effected in accordance with the MPEG-4 and/or H.264 standard.

The transcoder device is designed for decoding the coded output data from the database in a decoder module to form the video data in accordance with the active operating mode and subsequently coding them in an encoder module and outputting them as coded transmission data. Especially preferably the coding of the encoder module does not correspond to the first coding.

In a possible concrete embodiment of the invention, the coded output data are organized in such a manner that they have a multiplicity of key frames and a multiplicity of interframes, especially P-frames or B-frames. In videocoding, it is customary to group the coded image data in groups of pictures—so-called GoP—which are arranged from a group of successive frames, coded in dependence on one another, in the stream of images of a video sequence as image data. The key frame—also called intraframe—is a reference image in a group of pictures which corresponds to a freeze frame and is independent of the other image types in the same group of pictures. The key frame can thus be read out from the coded output data without extensive calculations.

After the decoding, the image data are present as video data, the video data preferably being designed as raw frames, that is to say as successive mutually independent images.

The video data are coded by the encoder module to form the coded transmission data, the coded transmission data preferably being organized again in groups of pictures (GoPs). In particular, the coding is effected in accordance with the MPEG-4 and/or H.264 standard.

It is preferably provided that in the Fast Forward and/or Fast Rewind operating mode, only key frames are selected as selected images from the coded output data. In contrast, no interframes are used which thus correspond to the intermediate frames. The selection of frames from a stream of image data is also called scratching. This embodiment has the advantage that the decoder module is greatly relieved of load since the key frames are independent of other frames in the image data stream and can therefore be decoded with less expenditure than the interframes.

In particular, it is provided that the key frames selected as selected images are converted by the decoder module into raw frames which are then converted into the coded transmission data by the encoder module. For example, from five groups of pictures of the coded output data having in each case five pictures, only the key frames are read out and converted into raw frames so that five raw frames are available. These five raw frames are subsequently converted by the encoder module into a further group of pictures which only has a single key frame and four subsequent interframes. By means of this signal processing, the loading on the transcoder device and at the same time on the network connection is minimized.

It is provided particularly preferably that in the Freeze Frame operating mode, new interframes are coded and sent to the client so that a current image is improved in the accuracy of its detail. In particular, the freeze frame is resharpened on the client. As an alternative, in the Freeze Frame operating mode the current image is recoded in an improved resolution, particularly in the maximum available resolution or in the resolution of the raw frame, and transmitted to the client. The transmission can take place especially via a group of pictures (GoP) so that initially a key frame with the improved resolution and, following it, interframes for improving the accuracy of detail are transmitted.

In a preferred embodiment of the invention, the image data relate to a stationary surveillance scene of at least one surveillance camera. In this embodiment, the video compression can be used particularly advantageously. Especially the Fast Forward and/or Fast Rewind are particularly effective since the selected images correspondingly show the identical surveillance scene, if necessary with different objects to be monitored.

A further subject matter of the invention relates to a method for displaying image data from a server on a client, wherein the client requests, processes further and displays image data for an active operating mode in a session from the server, wherein a coder device of the server codes video data in accordance with the active operating mode and sends these as coded transmission data to the client, wherein the coder device, apart from the Replay operating mode, can be operated in the Stop, Freeze Frame, Fast Forward and/or Fast Rewind operating mode as the active operating mode and wherein the client determines the active operating mode of the coder device.

BRIEF DESCRIPTION OF THE DRAWINGS

Further features, advantages and effects of the invention are obtained from the subsequent description of preferred illustrative embodiments of the invention and from the attached figures, in which:

FIG. 1 shows a schematic block diagram of a video system as a first illustrative embodiment of the invention;

FIG. 2 shows with the same representation as in FIG. 1 a video system as a second illustrative embodiment of the invention;

FIG. 3 shows a schematic illustration for illustrating the Fast Forward operating mode of the video systems in the preceding figures;

FIG. 4 shows a schematic illustration for illustrating the Freeze Frame operating mode of the video systems in the preceding figures in a first embodiment;

FIG. 5 shows a schematic illustration for illustrating the Freeze Frame operating mode of the video systems in the preceding figures in a second embodiment.

DETAILED DESCRIPTION

The image data are especially video sequences which have a multiplicity of successive images which are arranged in temporally equidistant intervals from one another so that a film can be displayed from the video sequence. In one possible application of the video system, the image data are designed as video sequences of surveillance cameras, the image data showing a stationary surveillance scene. This application can be implemented particularly advantageously in the video system 1 since the image data always have an essentially identical scene background, so that the image data can be particularly effectively compressed.

The video system 1 comprises a server 2 which is designed for providing output data. The output data for the image data are formed, e.g., during a surveillance by the image data transmitted from the at least one surveillance camera and deposited in a memory to which the server is connected or which is integrated in the server.

The video system 1 also comprises a client 3 which is connected to the server 2 via a network 4. The network 4 can be a cableless or cable-connected network, for example an Ethernet or the Internet. The client 3 is designed for requesting, processing further and displaying image data from the server 2 via the network 4.

To request image data, the client 3 can transmit commands B via the network 4 to the server 2. In particular, the selection of an active operating mode is conveyed to the server 2 via the commands B. The operating mode can be, for example, a Replay, a Stop, a Freeze Frame, a Fast Forward or a Fast Rewind.

During the replay, the image data are displayed on the client 3 at normal speed. In the Stop operating mode, no image data are displayed on the client 3. In the Freeze Frame operating mode, an active or current image of the image data is permanently displayed on the client 3. In the Fast Forward operating mode, the image data are displayed in a forward time lapse and in the case of a Fast Rewind are displayed in a backward time lapse.

The server 2 comprises a coder device 5 which selects and codes video data on the basis of the output data in accordance with the active operating mode and outputs them as coded transmission data. The video data are coded, for example, in accordance with the MPEG-4 standard codec or H.264 as deposited in the corresponding standards. The coder device 5 is designed as software or as a program entity and exclusively allocated to the client 3 during the period of a session. This means that the coder device 5 codes video data exclusively for the allocated client 3 during the session or period of utilization and outputs corresponding coded transmission data in dependence on the active operating mode.

It is the advantage of this set-up that the coder device 5 becomes active exclusively following commands B of the client 3 and occupies resources of the server 2. In order to be able to respond to the commands B and especially to the change in the active operating mode contemporaneously, the video data are coded in real time or "on-the-fly" or as required. This means, e.g., that as soon as the Stop operating mode becomes active via the command B, the coder device 5 stops the coding of video data.

In the Fast Forward or Fast Rewind operating mode as the active operating mode, it is possible that the coder device 5 only codes a selection of available images of the output data and conveys these as coded transmission data via the network 4 since in the case of a fast forward in a so-called scratch mode, only every second, third, fourth etc. frame of a sequence of frames needs to be displayed and thus transmitted. The same applies to the Fast Rewind operating mode where it is also possible to reduce the number of transmitted frames.

Considered realistically, the data transmission rate is often limited in a network 4. This circumstance is taken into account by the fact that the coder device 5 codes, and thus compresses, the video data before the transmission via the network 4. However, the customary video compression standards allow different compression factors which lead, on the one hand, to different qualities of the displayed image data on the client 3 and, on the other hand, to different data transmission rates—also called bit rates—of the coded transmission data. It is thus possible, for example, to select a lower bit rate during the compression in the case of a low available data transmission rate of the network 4.

On the one hand, the bit rate for coding the video data can be predetermined by the client 3, the client 3 having, for example, a selection field in which different bit rates are offered for selection. As soon as a bit rate is selected on the client 3, it is transmitted to the server 2 as a command B and the coder device 5 subsequently codes the video data to fit the selected bit rate. As an alternative or in addition, the frame rate or the frame size can also be determined via one or more commands B by the client 3 during the coding. As an alternative, the server 2 and/or the coder device 5 can have an adaptive or self-controlling or self-regulating parameter setting for parameters for the coding of the video data. For example, an output buffer, particularly a TCP/IP buffer of the server 2 to the network 4 is observed, the filling level of the output buffer being a measure of the completed transmission of coded transmission data. If the filling level of the buffer rises, it is concluded that the selected bit rate is too high for the available data transmission rate of the network 4 and the bit rate is lowered in the coding of the video data. If the filling level of the output buffer drops too much, it is found that the bit rate is too low for the available data transmission rate of the network 4. In this case, the bit rate is increased in the coding of the video data.

The automatic or manual change of the bit rate is implemented immediately by the coder device 5 so that the video data are only coded with a single bit rate as parameter and, in particular, are not coded in parallel in several copies having different bit rates.

In the Freeze Frame operating mode, the active image is initially displayed with the current coding on the client 3. Since, however, the coding of further video data and the output of coded transmission data is paused according to the active operating mode of Freeze Frame after the transmission of the Freeze Frame operating mode via the command B, the coder device is unoccupied, on the one hand, and, on the other hand, sufficient data transmission rate of the network 4 is available. In the Freeze Frame operating mode, the active image is recoded, the active image being transmitted with an improved resolution or a lower coding, in any case with better quality to the client 3. This can be a retransmission of the active image or an addition of image information to the active image which is already present on the client 3.

FIG. 2 shows a second illustrative embodiment of the invention, identical components being again provided with identical reference symbols so that reference is made to the preceding description. In the illustrative embodiment in FIG. 2, the signal path of the image data in the server 2 is explained more precisely. The image data coming from the outside are deposited in a memory 6, the image data being stored as coded output data A. For example, the image data are compressed on the basis of the MPEG-4 or H.264 codec.

The coded output data A are subsequently transferred to the coder device 5 which is designed as a transcoder device in the present illustrative embodiment. In this embodiment, the coder device 5 comprises a decoder module 7 and an encoder module 8. In the decoder module 7, the coded output data from the memory 6 are decoded and are subsequently available as video data V in the form of a series of successive frames which are independent of one another. In particular, the video data V are designed as so-called raw frames.

In the encoder module 8, the video data V are coded into coded transmission data U, using the MPEG-4 process or the H.264 standard. The coding in the encoder module 8 is dependent on the active operating mode and/or on the selected parameters, especially the selected data transmission rate/bit rate or the image resolution or the frame rate fps (frames per second) for the coded transmission data.

FIG. 3 illustrates the method for generating coded transmission data U in the active operating mode of Fast Forward. In the lower area of FIG. 3, the coded output data A are diagrammatically illustrated as stored in the memory 6. The coded output data A are ordered in groups of pictures GoP, each GoP comprising a key frame 9—also called intraframe—and a multiplicity of interframes 10.

Each of the frames 9, 10 corresponds to a frame in a video sequence. The key frame 9 is independent of other frames and contains all the image information for its associated picture. The interframes, in contrast, relate to preceding or subsequent frames, so that an interframe 10 alone does not have all the image information necessary for the basic picture.

In the Fast Forward operating mode—also called scratch mode—the coder device 5, especially the decoder module 7, only selects the key frames 9 of the output data A and discards the interframes 10. In the example shown, only every fourth frame is thus decoded. The decoding requires little effort since all the image information is already present in the key frames 9. As a result, the video data V are present in the form of raw frames 11 which form selected images of the original image data since three intermediate frames, in this case interframes 10, are arranged in each case between the selected images 11.

It is also possible that only every second, third or nth key frame 9 is decoded for the video data V and the intermediate frames 9, 10 are discarded. The Fast Forward operating mode has the advantage that very wide time ranges can be scanned in a simple manner.

In the encoder module 8, the raw frames 11 of the video data V are coded to form the coded transmission data U which are again designed as GoPs with key frames 9 and interframes 10. The parameters of the coding are independent of the parameters of the coding of the image data for the coded output data A. These coded transmission data U are subsequently transmitted via the network 4 to the client 3. The client 3 receives the coded transmission data, decodes them and displays the image data in the active operating mode of Fast Forward.

The advantage of this type of Fast Forward lies in the fact that the decoding only requires very little computing time since only key frames 9 are used as selected images. Independently of this, only those frames which are actually also to be displayed are coded for transmission to the client 3. This leads to an effective reduction of the data transmission via the network 4 and of the data preparation by the coder device 5. The Fast Rewind operating mode can be analogously implemented.

FIG. 4 shows, in the same representation as FIG. 3, the Freeze Frame operating mode in a first embodiment. In this operating mode, it is assumed that the user activates the Freeze Frame operating mode at the client 3 with a current or active image at a time t0. The operating mode is transmitted as command B to the server 2 and especially to the coder device 5. This server or coder device does not code any new video data V but begins to recode the image current at time t0—in the present case transmitted as an interframe 10—from the corresponding raw frame 11 in order to improve the image quality, especially the accuracy of detail of the current image displayed on the client 3. For this purpose, further interframes 10 are coded by the decoder module 8 from the raw frame 11 of the current image which contain further detailed information from the raw frame 11 and are transmitted as transmission data U to the client 3. The client 3 receives the additional interframes 10 for the current image and can display the latter subsequently in better quality.

FIG. 5 shows a modified illustrative embodiment wherein, after the activation for the Freeze Frame operating mode, the raw frame 11 corresponding to the current image is recoded and is transmitted as GoP with a key frame 9 and other interframes 10 to the client 3. This modified embodiment has the advantage that the image resolution, that is to say the number of pixels per frame, can also be altered in the Freeze Frame operating mode. Thus, it is possible, e.g., to request the current image again in improved resolution by means of the Freeze Frame operating mode in the case of a bandwidth-limited network connection via the network 4.

The invention claimed is:

1. A video system (1) for displaying image data, the video system (1) comprising:
    a server (2) having a coder device (5) which can be operated in a number of operating modes, wherein the coder device (5) is configured to code video data (V) in accordance with an active operating mode and to output coded transmission data (U); and
    a client (3) connected to the server (2) via a network (4), and configured to request, to further process, and to display the coded transmission data (U) from the coder device (5);
    wherein the client (3) conveys the active operating mode to the coder device (5), the coder device (5) changing the coder device's (5) operating mode to the active operating mode; and
    wherein the coder device (5) operates in the active operating mode, and is exclusively allocated to the client (3) during the session, outputting coded transmission data in accordance with the active operating mode.

2. The video system (1) according to claim 1, wherein the active operating mode, apart from a Replay operating mode, is at least one of a Stop, a Freeze Frame, a Fast Forward, and a Fast Rewind operating mode.

3. The video system (1) according to claim 2, wherein the Fast Forward and/or Fast Rewind operating mode, a selection of frames (9) of the image data are output as coded transmission data (U) as selected frames by the coder device (5), at least one intermediate frame (10) being arranged in the image data between the selected frames.

4. The video system (1) according to claim 1, wherein the coder device (5) is configured to code the video data (V) in real time.

5. The video system (1) according to claim 1, wherein the Freeze Frame operating mode, a current image of the video data (V) is recoded in increased quality and transmitted to the client (3).

6. The video system (1) according to claim 1, wherein the coder device is designed as a transcoder device (5) and in that the server (2) has a storage device (6) in which coded output data (A) are deposited, the transcoder device (5) configured to, based on the active operating mode, decode the coded output data (A) from the storage device (6) in a decoder module (7) to form the video data (V) and to subsequently code them in an encoder module (8) and output them as coded transmission data (U).

7. The video system (1) according to claim 6, wherein the coded output data (A) have a multiplicity of key frames (9) and a multiplicity of interframes (10), wherein, in a Fast Forward and/or a Fast Rewind operating mode, only key frames (9) are selected as selected frames from the coded output data (A).

8. The video system (1) according to claim 7, wherein the key frames (9) selected as selected frames are converted by the decoder module (7) into raw frames (11) which are converted into the coded transmission data (U) by the encoder module (8).

9. The video system (1) according to claim 6, wherein the coded transmission data (U) have a multiplicity of key frames (9) and a multiplicity of interframes (10), wherein, in a Freeze Frame operating mode, a current frame is recoded on the basis of the coded output data (A) or the video data (V), wherein additional interframes (10) are generated or recorded for the current frame, wherein an additional group of pictures (GoP) with a key frame (9) and interframes (10) are generated for the current frame and the additional interframes (10) or the additional group of pictures (GoP) are transmitted to the client as coded transmission data.

10. The video system (1) according to claim 1, wherein the image data show a stationary surveillance scene of at least one surveillance camera.

11. A coder device (5) for a video system according to claim 1,
wherein the coder device (5) can be operated in a number of operating modes as the active operating mode,
wherein the coder device (5) is designed for coding video data (V) in accordance with the active operating mode and for outputting coded transmission data (U),
characterized in that the coder device (5), apart from the Replay operating mode, can be operated in a Stop and/or a Freeze Frame and/or a Fast Forward and/or a Fast Rewind operating mode as the active operating mode, wherein the coder device is designed in such a manner that a client (3) determines the active operating mode of the coder device (5).

12. A method for displaying image data from a server (2) on a client (3), wherein the client (3) requests, processes further and displays image data for an active operating mode in a session from the server (2), wherein a coder device (5) of the server (3) codes video data (V) in accordance with an active operating mode and sends these as coded transmission data (U) to the client (3) in accordance with the active operating mode, wherein the client (3) conveys the active operating mode to the coder device (5) and the coder device (5) changes the coder device's (5) operating mode to the active operating mode, and is exclusively allocated to the client (3) during the session.

13. The method according to claim 12, wherein the active operating mode, apart from a Replay operating mode, is at least one of a Stop, a Freeze Frame, a Fast Forward, and a Fast Rewind operating mode.

14. A computer program with program code means for performing all steps of the method according to claim 12 when the program is executed on a computer and/or a video system (11) comprising a server (2) having a coder device (5) which can be operated in a number of operating modes, the coder device (5) is configured to code video data (V) in accordance with an active operating mode and to output coded transmission data (U); and a client (3) connected to the server (2) via a network (4), and configured to request, to further process, and to display the coded transmission data (U) from the coder device (5).

15. A video system (1) for displaying image data, the video system (1) comprising:
a server (2) having a coder device (5) which can be operated in a number of operating modes, wherein the coder device (5) is configured to code video data (V) in accordance with an active operating mode and to output coded transmission data (U); and
a client (3) connected to the server (2) via a network (4), and configured to request, to further process, and to display the coded transmission data (U) from the coder device (5);
wherein the client (3) conveys the active operating mode to the coder device (5), the coder device (5) changing the coder device's (5) operating mode to the active operating mode; and
wherein the coder device (5) operates in the active operating mode, and is exclusively allocated to the client (3) during the session, outputting coded transmission data in accordance with the active operating mode,
wherein the coder device is designed as a transcoder device (5) and in that the server (2) has a storage device (6) in which coded output data (A) are deposited, the transcoder device (5) configured to, based on the active operating mode, decode the coded output data (A) from the storage device (6) in a decoder module (7) to form the video data (V) and to subsequently code them in an encoder module (8) and output them as coded transmission data (U).

16. A video system (1) for displaying image data, the video system (1) comprising:
a server (2) having a coder device (5) which can be operated in a number of operating modes, wherein the coder device (5) is configured to code video data (V) in accordance with an active operating mode and to output coded transmission data (U); and
a client (3) connected to the server (2) via a network (4), and configured to request, to further process, and to display the coded transmission data (U) from the coder device (5);
wherein the coder device (5) operates in the active operating mode as determined by the client (3);
wherein the coder device is designed as a transcoder device (5) and in that the server (2) has a storage device (6) in which coded output data (A) are deposited, the transcoder device (5) configured to, based on the active operating mode, decode the coded output data (A) from the storage device (6) in a decoder module (7) to form the video data (V) and to subsequently code them in an encoder module (8) and output them as coded transmission data (U);
wherein the coded transmission data (U) have a multiplicity of key frames (9) and a multiplicity of interframes (10), wherein, in a Freeze Frame operating mode, a current frame is recoded on the basis of the coded output data (A) or the video data (V), wherein additional interframes (10) are generated or recorded for the current frame, wherein an additional group of pictures (GoP) with a key frame (9) and interframes (10) are generated for the current frame and the additional interframes (10) or the additional group of pictures (GoP) are transmitted to the client as coded transmission data.

17. A video system (1) for displaying image data, the video system (1) comprising:
a server (2) having a coder device (5) which can be operated in a number of operating modes, wherein the coder device (5) is configured to code video data (V) in accordance with an active operating mode and to output coded transmission data (U); and
a client (3) connected to the server (2) via a network (4), and configured to request, to further process, and to display the coded transmission data (U) from the coder device (5);
wherein the client (3) conveys the active operating mode to the coder device (5), the coder device (5) changing the coder device's (5) operating mode to the active operating mode; and
wherein the coder device (5) operates in the active operating mode, and is exclusively allocated to the client (3) during the session, outputting coded transmission data in accordance with the active operating mode; and
wherein the coded transmission data (U) have a multiplicity of key frames (9) and a multiplicity of interframes (10), wherein, in a Freeze Frame operating mode, a current frame is recoded on the basis of the coded output data (A) or the video data (V), wherein additional interframes (10) are generated or recorded for the current frame, wherein an additional group of pictures (GoP) with a key frame (9) and interframes (10) are generated for the current frame and the additional interframes (10) or the additional group of pictures (GoP) are transmitted to the client as coded transmission data.

\* \* \* \* \*